United States Patent
Coté et al.

(10) Patent No.: US 8,977,512 B1
(45) Date of Patent: Mar. 10, 2015

(54) METHOD AND APPARATUS FOR ALIGNMENT HARMONIZATION

(75) Inventors: Almond J. Coté, Auburn, NH (US); Kirby A. Smith, Derry, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 316 days.

(21) Appl. No.: 13/524,081

(22) Filed: Jun. 15, 2012

Related U.S. Application Data (60) Provisional application No. 61/498,199, filed on Jun. 17, 2011.

(51) Int. Cl.
*G01C 25/00* (2006.01)
*G01P 21/00* (2006.01)

(52) U.S. Cl.
CPC .............. *G01C 25/005* (2013.01); *G01P 21/00* (2013.01)
USPC ................................ 702/92; 73/1.38; 73/1.78

(58) Field of Classification Search
CPC ............................. G01C 25/00; G01C 25/005
USPC ...................... 73/1.37–1.38, 1.78; 702/92, 96
See application file for complete search history.

(56) References Cited

U.S. PATENT DOCUMENTS

| | | | | |
|---|---|---|---|---|
| 5,309,250 | A * | 5/1994 | Giacometti | 358/406 |
| 5,321,631 | A * | 6/1994 | Germanetti | 701/501 |
| 8,738,317 | B2 * | 5/2014 | Petillon et al. | 702/145 |

OTHER PUBLICATIONS

"Advanced Baresight Equipment", AAI Corporation Product Page, 2011. 1 pg. Printed from http://www.aaicorp.com/products/test/abe.html on May 29, 2012.
"Advanced Boresight Equipment (ABE)", AAI Corporation Brochure, 2011. 4 pgs. Printed from http://www.aaicorp.com/pdfs/AAI ABE.pdf on May 29, 2012.
"On Target with Precision Alignment", AAI Corporation Pamphlet. 2 pgs. Printed from http://www.aaicorp.com/pdfs/aai_abe07-07-06.pdf on May 29, 2012, some text portions not legible.

* cited by examiner

*Primary Examiner* — Thomas P Noland
(74) *Attorney, Agent, or Firm* — Finch & Maloney PLLC; Daniel J. Long (57) ABSTRACT

Techniques and architecture are disclosed for performing alignment harmonization of a collection of electro-optical and/or gimbaled componentry that is to operate within a common coordinate frame. In some cases, the techniques and architecture can provide a cost- and time-efficient approach to achieving alignment harmonization that is compatible, for example, with field-test and/or operational environments. In some instances, the techniques and architecture can be used in concert with error calibration techniques to further improve the accuracy of the alignment harmonization. The techniques and architecture can be utilized with a wide range of components (e.g., sensors, armaments, targeting systems, weapons systems, countermeasure systems, navigational systems, surveillance systems, etc.) on a wide variety of platforms. Numerous configurations and variations will be apparent in light of this disclosure.

11 Claims, 4 Drawing Sheets

METHOD AND APPARATUS FOR ALIGNMENT HARMONIZATION

CROSS-REFERENCE TO RELATED APPLICATIONS

This application claims the benefit of U.S. Provisional Patent Application Ser. No. 61/498,199, filed on Jun. 17, 2011, which is herein incorporated by reference in its entirety.

STATEMENT OF GOVERNMENT INTEREST

The invention was made with United States Government support under Contract No. DAAE07-97-C-X073 awarded by the United States Army. The United States Government has certain rights in this invention.

FIELD OF THE DISCLOSURE

The invention relates to componentry alignment, and more particularly to alignment harmonization of electro-optical and gimbaled componentry.

BACKGROUND

Component alignment on a given platform involves a number of non-trivial challenges, and electro-optical and gimbaled componentry have faced particular complications, such as those with respect to alignment harmonization.

SUMMARY

One example embodiment of the present invention provides an alignment harmonization system including an inertial measurement unit (IMU) configured to output angular rate data relating to an attitude of a common reference surface of a platform and an attitude of a reference surface of a unit under alignment (UUA), wherein the common reference surface and the UUA reference surface operate within a common coordinate frame, and a processor operatively coupled with the IMU and configured to interpret the angular rate data to determine a difference in attitude between the common reference surface and the UUA reference surface. In some cases, the system further includes the common reference surface and the UUA reference surface. In some such embodiments, the common reference surface comprises a portion of the platform configured to operatively couple with the IMU. In some other such embodiments, the common reference surface comprises a reference plate operatively coupled with the platform and configured to operatively couple with the IMU. In some instances, the UUA reference surface comprises a portion of the UUA configured to operatively couple with the IMU. In some other such instances, the UUA reference surface comprises a reference plate operatively coupled with the UUA and configured to operatively couple with the IMU. In some cases, the IMU is joined with an interface configured to operatively couple with the common reference surface and with the UUA reference surface. In some such cases, the common reference surface is configured with an alignment slot and an alignment hole configured to be operatively coupled with the interface, and wherein the UUA reference surface is configured with an alignment slot and an alignment hole configured to be operatively coupled with the same interface. In some embodiments, the processor is implemented in a laptop, a handheld electronic device, an on-board computer of the platform, and/or the IMU. In some instances, the IMU is calibrated to correct for at least one error associated with the IMU.

Another example embodiment of the present invention provides a method of performing alignment harmonization, the method including the steps of operatively coupling an inertial measurement unit (IMU) with a common reference surface of a platform and beginning collection of a first set of angular rate data, uncoupling the IMU from the common reference surface and transitioning the IMU to a reference surface of a unit under alignment (UUA), and operatively coupling the IMU with the UUA reference surface and stopping collection of the first set of angular rate data. In some cases, the method further includes using the first set of angular rate data to determine a difference in attitude between the common reference surface and the UUA reference surface. In some such instances, the method further includes, after operatively coupling the IMU with the UUA reference surface and stopping collection of the first set of angular rate data, the steps of uncoupling the IMU from the UUA reference surface, operatively coupling the IMU with the common reference surface, and beginning collection of a second set of angular rate data, uncoupling the IMU from the common reference surface and transitioning the IMU to a reference surface of a second UUA, and operatively coupling the IMU with the reference surface of the second UUA and stopping collection of the second set of angular rate data. In some such embodiments, the method further includes using the second set of angular rate data output by the IMU to determine a difference in attitude between the common reference surface and the reference surface of the second UUA. In some embodiments, the common reference surface and the UUA reference surface operate within a common coordinate frame. In some cases, the method further includes, before operatively coupling the IMU with the common reference surface of the platform, the step of calibrating the IMU. In some such instances, calibrating the IMU includes the steps of determining a latitude and attitude of the common reference surface of the platform, a heading of the common reference surface with respect to true north, and gravitational direction, operatively coupling the IMU with the common reference surface for a period of time to capture angular rate error data, and uncoupling the IMU from the common reference surface, rotating the IMU, and recoupling the IMU with the common reference surface to capture rate scale factor error data. In some such embodiments, the angular rate error data is used to improve alignment harmonization. In some other such embodiments, the rate scale factor error data is used to improve alignment harmonization.

Yet another example embodiment of the present invention provides an alignment harmonization device including an inertial measurement unit (IMU) configured to output angular rate data relating to an attitude of a common reference surface of a platform and an attitude of a reference surface of a unit under alignment (UUA), wherein the common reference surface and the UUA reference surface operate within a common coordinate frame, a processor operatively coupled with the IMU and configured to interpret the angular rate data to determine a difference in attitude between the common reference surface and the UUA reference surface, and a power source operatively coupled with the IMU and configured to provide power to the IMU, wherein the device is configured to be operatively coupled with the common reference surface and with the UUA reference surface.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques and architecture are disclosed for performing alignment harmonization of a collection of electro-optical and/or gimbaled componentry that is to operate within a common coordinate frame. In some cases, the techniques and architecture can provide a cost- and time-efficient approach to achieving alignment harmonization that is compatible, for example, with field-test and/or operational environments. In some instances, the techniques and architecture can be used in concert with error calibration techniques to further improve the accuracy of the alignment harmonization. The techniques and architecture can be utilized with a wide range of components (e.g., sensors, armaments, targeting systems, weapons systems, countermeasure systems, navigational systems, surveillance systems, etc.) on a wide variety of platforms. Numerous configurations and variations will be apparent in light of this disclosure.

General Overview

As previously indicated, there are a number of non-trivial issues that can complicate component alignment. For instance, one non-trivial issue pertains to the fact that, when a collection of separate electro-optical and gimbaled functional components (e.g., such as may be implemented in sensors, countermeasures, navigation, weapons systems and armaments, etc.) are to operate or otherwise be used in concert within a common coordinate frame, it is necessary to determine the alignments of their angular attitudes relative to a common reference. The relative alignment of each component is determined during a process known as alignment harmonization.

Typical approaches involve making far-field measurements using a theodolite as the common reference or making near-field measurements requiring the complicated use of protractors and lines drawn on the ground. However, these approaches are very time consuming (e.g., harmonization can take several days to be properly completed using this approach) and typically require a level surface/platform on which to perform the alignment harmonization. Other example approaches involve complex and prohibitively expensive equipment. In addition, the aforementioned techniques/approaches are notably error prone. Furthermore, such extended alignment harmonization process times and expensive equipment are both highly undesirable, for example, for field-test and/or operational contexts. Other flaws and disadvantages inherent to existing approaches/techniques will be apparent in light of this disclosure.

Therefore, there is need for a way to directly and swiftly perform alignment harmonization for a given collection of electro-optical and/or gimbaled components on a given platform while being compatible with field-test and/or operational environments (e.g., without requiring a level platform, at relatively low cost, in a time-efficient manner, etc.).

Thus, and in accordance with an embodiment of the present invention, techniques and architecture are disclosed for a local approach to directly measuring component alignment for achieving alignment harmonization. The disclosed techniques and architecture can be utilized to harmonize the alignment of a collection of electro-optical and/or gimbaled components (e.g., such as may be implemented in sensors, armaments, targeting systems, weapons systems, countermeasure systems, navigational systems, surveillance systems, etc.) that is to operate within a common coordinate frame. In some cases, the techniques and architecture can provide a cost- and time-efficient approach to achieving alignment harmonization that is compatible, for example, with field-test and/or operational environments.

In accordance with an embodiment of the present invention, an alignment harmonization system is disclosed. In some such embodiments, the alignment harmonization system includes an inertial measurement unit (IMU) that is operatively coupled with one or more processors. In some instances, the alignment harmonization system may include additional componentry (e.g., power supply, data cable, wireless interfacing, Bluetooth capability, compass, g sensor, GPS, etc.), as suitable for a given application. In some cases, the alignment harmonization system can be configured as a single, integral package/device, while in some other cases one or more components of the device/system may be discrete or otherwise separate.

In accordance with an embodiment, the IMU (whether discrete or part of an integral package) can be passed from a common reference surface of a given platform to a reference surface of a unit under alignment (UUA) (e.g., the unit having the electro-optical and/or gimbaled components to undergo alignment harmonization). The resultant measured angular rate data output by the IMU then can be provided to the one or more operatively coupled processors, which interpret or otherwise analyze (e.g., integrate) the data to determine the angular attitude differences between the common reference surface and the UUA reference surface, thereby permitting alignment harmonization of the UUA component(s).

In accordance with an embodiment, to help minimize or otherwise reduce cost, a low-cost IMU may be utilized in the alignment harmonization device/system. However, as will be appreciated, some low-cost IMUs generally may have significant sources of error which, upon interpretation (e.g., integration) by an operatively coupled processor, normally would detract from overall alignment accuracy. Such errors include, but are not limited to: (1) 3σ angular random walk; (2) g-insensitive drift rate; (3) g-sensitive drift rate; (4) rate scale factor error; (5) misalignment error; and (6) Earth's rate. Therefore, in accordance with an embodiment, the disclosed alignment harmonization techniques and architecture can be used in concert with one or more error calibration techniques to minimize or otherwise reduce (e.g., such as by calibrating out) one or more of such errors to further improve alignment accuracy and thereby improve alignment harmonization. For instance, and in accordance with an embodiment, the effects of one or more angular rate errors (e.g., g-insensitive drift rate, g-sensitive drift rate, rate scale factor error, and/or Earth's rate) may be minimized or otherwise reduced by using the techniques/architecture described herein.

As will be appreciated in light of this disclosure, some embodiments of the present invention may realize advantages/benefits as compared to the existing alignment harmonization equipment/approaches previously discussed. For example, some embodiments of the present invention may realize a substantial reduction in: (1) the amount of time required to achieve alignment harmonization (e.g., less than one hour as compared with existing approaches, which may take several days); and/or (2) the cost of alignment harmonization (e.g., given that the disclosed alignment harmonization system can utilize inexpensive componentry). Also, some embodiments may realize a substantial improvement in, for example: (1) alignment harmonization accuracy and dependability (e.g., such as by compensating for one or more errors); and/or (2) ease of implementation in the field (e.g., given that the disclosed alignment harmonization system can utilize a minimal number of components). Furthermore, and in accordance with an embodiment, the disclosed techniques and architecture can allow a user to harmonize the alignment of various components at the site of any UUA without having to activate the UUA and to do so rapidly in any host platform orientation. Still further, in accordance with an embodiment, the disclosed techniques/architecture may allow for a user to perform a quick alignment check to ensure that alignment harmonization still holds true after a given period of time. Other advantages/benefits associated with one or more embodiments of the present invention will depend on a given application and will be apparent in light of this disclosure.

As will be appreciated in light of this disclosure, the alignment harmonization techniques and architecture described herein may be utilized in a variety of contexts (e.g., experimental research, laboratory, field-test, operations, deployment, combat/warzone, etc.), in accordance with an embodiment. As will further be appreciated in light of this disclosure, one or more embodiments of the present invention may be implemented, for example, with a variety of devices, systems, and/or platforms regardless of environment/context (air, land and/or sea vehicles, etc.). Other suitable uses of one or more embodiments of the present invention will depend on a given application and will be apparent in light of this disclosure.

Alignment Harmonization System Architecture

Figure 1:
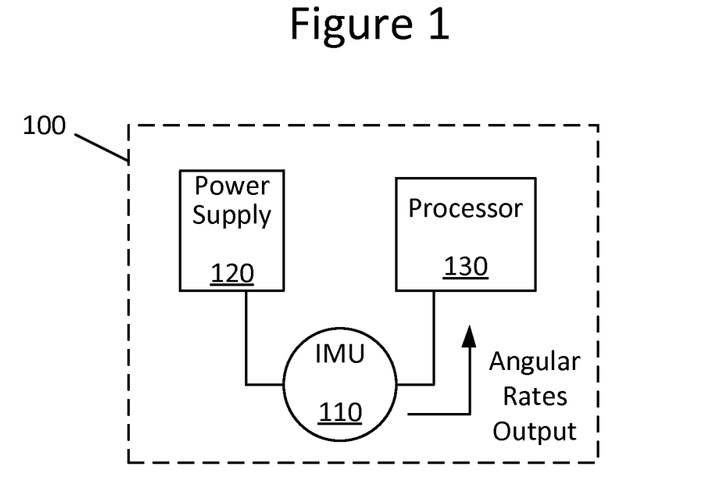
FIG. 1 is a schematic view of an alignment harmonization system configured in accordance with an embodiment of the present invention.

FIG. 1 is a schematic view of an alignment harmonization system 100 configured in accordance with an embodiment of the present invention. As can be seen, alignment harmonization system 100 includes an inertial measurement unit (IMU) 110 that is operatively coupled, for example, with a power supply 120 and one or more processors 130. In general, an IMU is an electrical device or apparatus that measures and reports angular rotation rates about, and translational acceleration along, three orthogonal axes (or a sub-set of those axes) using, for example, a combination of accelerometers and gyroscopes. Other suitable instrumentation that can effectively operate as an IMU can be used as well, as will be appreciated in light of this disclosure. As will be further appreciated in light of this disclosure, alignment harmonization system 100 may include additional, fewer, and/or different elements or components from those here described (e.g., user interfaces, data cables, wireless interfacing, Bluetooth® capability, compass, g sensor, GPS, etc.), and the claimed invention is not intended to be limited to any particular system configurations, but can be used with numerous configurations in numerous applications. Also, as previously noted, and in accordance with one example embodiment, alignment harmonization system 100 can be configured as a single, integral package (e.g., all components are integrated into a single die or device) in some cases. However, in accordance with another example embodiment, alignment harmonization system 100 may be configured instead with one or more components that are discrete or otherwise separate and populated, for example, onto a printed circuit board. In some still other cases, and in accordance with an embodiment, alignment harmonization system 100 may comprise a discrete IMU 110 configured to be interfaced (e.g., via wired, wireless, or other suitable connection) with processor 130. Numerous degrees of functional integration can be implemented depending on factors such as desired chip count and packaging size.

In accordance with an embodiment of the present invention, a number of factors may be considered in choosing a suitable IMU 110. For example, it may be desirable, in accordance with an embodiment, to ensure that IMU 110 has a suitable level of accuracy (e.g., a sufficiently low initial error and/or error which may be substantially calibrated out). As will be appreciated, providing such an IMU 110 may assist with reducing/minimizing the amount of time required for achieving alignment harmonization. However, it may be desirable to provide such an IMU 110, for example, without incurring great expense, thus reducing/minimizing the overall cost of alignment harmonization system 100. Furthermore, performance characteristics such as functional temperature range, compatibility with other componentry of alignment harmonization system 100 (e.g., processor 130), data output capabilities, and input power requirements may be considered in choosing a suitable IMU 110 for a given application. As will be appreciated in light of this disclosure, and in accordance with an embodiment, IMU 110 may be a standard, custom, or hybrid IMU, and in some instances may be configured with one or more mechanical and/or solid state (e.g., ring laser, fiber optic, piezoelectric, etc.) gyroscopic components. Other suitable configurations for IMU 110 will depend on a given application and will be apparent in light of this disclosure.

In some cases, it may be desirable to minimize or otherwise reduce the need for field calibration of IMU 110, and thus reduce the process time required to achieve alignment harmonization. Therefore, in accordance with an embodiment, IMU 110 optionally may be pre-calibrated (e.g., before receipt from the manufacturer or otherwise before field/operational use), for example: (1) for a wide range of operable temperature conditions; and/or (2) for one or more of the principal sources of angular rate error (discussed above). However, the claimed invention is not so limited, as an IMU 110 having sufficiently small or otherwise negligible errors may be utilized without such optional pre-calibration, in accordance with an embodiment. Furthermore, as previously noted, it may be desirable in some instances to provide these and other considerations without incurring great expense. Other considerations for optional pre-calibration of IMU 110 will depend on a given application and will be apparent in light of this disclosure.

In accordance with an embodiment, it may be desirable to ensure that IMU 110 is properly oriented and substantially flush, for example, with a common reference surface 310 of a given platform 300 and/or with a reference surface 410 of a given unit under alignment (UUA) 400 to obtain accurate data. Thus, in some embodiments, IMU 110 may be implemented with one or more features configured to aid with proper interfacing.

Figure 2:
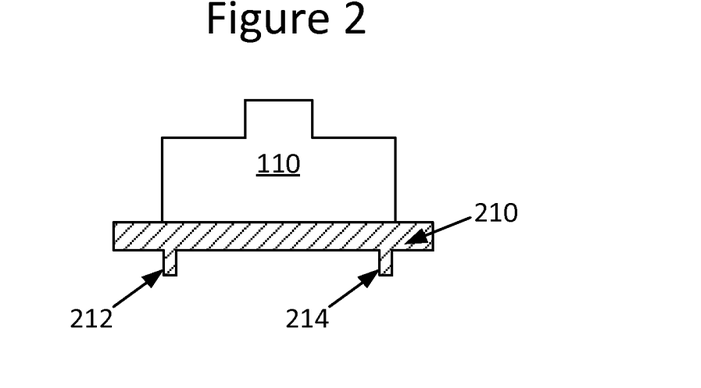
FIG. 2 is a side perspective view of an inertial measurement unit (IMU) operatively coupled with an optional interface configured in accordance with an embodiment of the present invention.

For example, FIG. 2 is a side perspective view of an IMU 110 operatively coupled with an optional interface 210 configured in accordance with an embodiment of the present invention. IMU 110 may be permanently and/or removably joined with interface 210, for example, to help ensure accurate and repeatable placement of IMU 110 on a common reference surface 310 and/or on a UUA reference surface 410, in accordance with an embodiment. In some cases, interface 210 may be configured with a series of alignment pins 212 and 214 (e.g., posts, tabs, protrusions, etc.) or other suitable feature(s) configured to engage, respectively, a corresponding alignment slot 222 and alignment hole 224 (discussed below). Interface 210 may comprise any material having sufficient rigidity, durability, and thermal expansion characteristics suitable for a given application. For instance, interface 210 may comprise a material such as, but not limited to, aluminum (Al), titanium (Ti), steel, etc. As will be appreciated in light of this disclosure, it may be desirable to ensure that interface 210 provides and retains a flat/level surface to minimize or otherwise reduce the possibility of introducing additional errors into the data obtained by IMU 110.

Figure 3A:
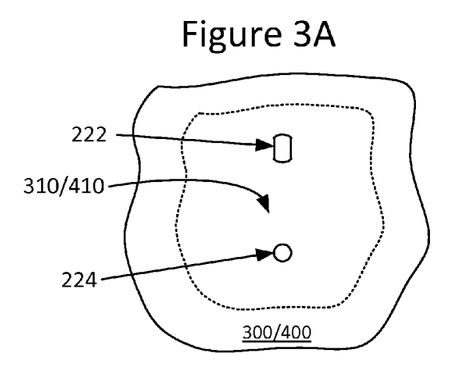
FIG. 3A is a front perspective view of a common reference surface/unit under alignment (UUA) reference surface having an alignment slot and an alignment hole formed therein in accordance with an embodiment of the present invention.
Figure 3B:
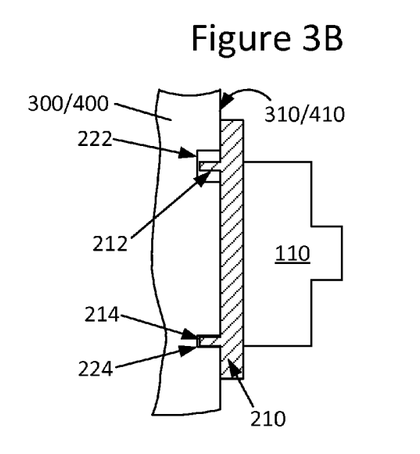
FIG. 3B is a cross-section view illustrating an IMU operatively coupled with the common reference surface/UUA reference surface of FIG. 3A.

FIG. 3A is a front perspective view of a common reference surface 310/UUA reference surface 410 having an alignment slot 222 and an alignment hole 224 formed therein in accordance with an embodiment of the present invention. FIG. 3B is a cross-section view illustrating an IMU 110 operatively coupled with the common reference surface 310/UUA reference surface 410 of FIG. 3A. As can be seen, in some embodiments alignment slot 222 and alignment hole 224 can be formed: (1) directly in a portion (e.g., a surface) of platform 300 (e.g., common reference surface 310 is formed directly in/on platform 300); and/or (2) directly in a portion (e.g., a surface) of UUA 400 (e.g., UUA reference surface 410 is formed directly in/on UUA 400). As can be seen with particular reference to FIG. 3B, optional interface 210 may be inserted into or otherwise mated with common reference surface 310 and/or UUA reference surface 410 (e.g., by placement of alignment pin 212 in alignment slot 222 and alignment pin 214 in alignment hole 224).

In some cases, it may be desirable to configure alignment slot 222 with at least one dimension that is different from alignment hole 224. For instance, in one specific example embodiment, alignment slot 222 and alignment hole 224 can be configured to have different diameters, and alignment pins 212 and 214 can be correspondingly configured. As will be appreciated, the alignment pin of greater diameter will not readily mate with the alignment feature (e.g., alignment slot 222 or alignment hole 224) of lesser diameter, and so such an embodiment may assist with ensuring consistent, proper orientation of IMU 110 (with or without optional interface 210) with a given surface having such alignment features. Also, in another specific example embodiment, alignment slot 222 can be configured with a longer length than alignment hole 224 to mitigate or otherwise compensate for the effects, if any, of thermal expansion on achieving and maintaining operative coupling between IMU 110 (with or without optional interface 210) and a given surface having such alignment features.

In accordance with an embodiment, it may be desirable to ensure that alignment slot 222 and alignment hole 224 are configured/dimensioned to snugly receive alignment pin 212 and 214, respectively, without requiring substantial application of force. As will be appreciated in light of this disclosure, an appropriately snug fit may minimize or otherwise reduce the likelihood of introducing errors resulting from give/play in the operative coupling of IMU 110 with a given surface. Other configurations/considerations for alignment pins 212 and 214, alignment slot 222, and/or alignment hole 224 will depend on a given application and will be apparent in light of this disclosure.

Figure 4A:
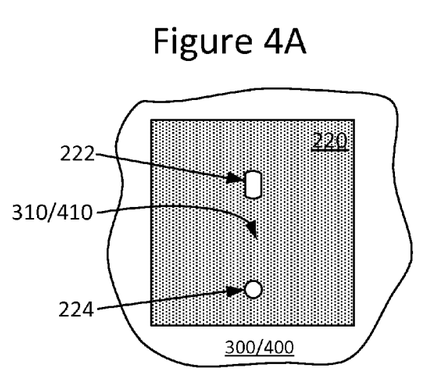
FIG. 4A is a front perspective view of a reference plate configured in accordance with an embodiment.
Figure 4B:
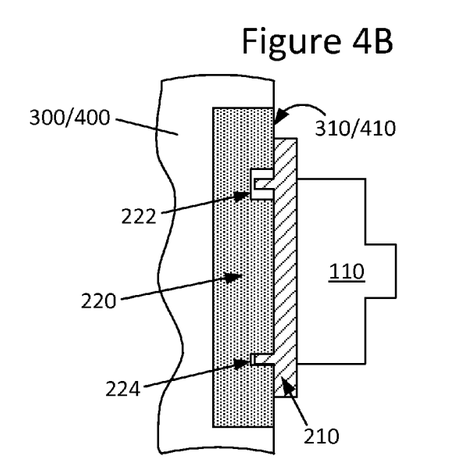
FIG. 4B is a cross-section view of an IMU operatively coupled with the reference plate of FIG. 4A.

FIG. 4A is a front perspective view of a reference plate 220 configured in accordance with an embodiment. FIG. 4B is a cross-section view of an IMU 110 operatively coupled with the reference plate 220 of FIG. 4A. As can be seen, in some embodiments an alignment slot 222 and an alignment hole 224 can be formed in a reference plate 220. Alignment slot 222 and alignment hole 224 in reference plate 220 may be configured in much the same way and may serve much the same purpose as discussed above with reference to FIGS. 3A and 3B. In accordance with an embodiment, reference plate 220 may be integrated into or otherwise operatively coupled, for example: (1) with platform 300 (e.g., a reference plate 220 having an alignment slot 222 and an alignment hole 224 provides a common reference surface 310); and/or (2) with UUA 400 (e.g., a reference plate 220 having an alignment slot 222 and an alignment hole 224 provides a UUA reference surface 410). However, the claimed invention is not so limited; for instance, in accordance with an embodiment, a bezel or other suitable mounting ring may be configured to provide a common reference surface 310 and/or a UUA reference surface 410. Other suitable configurations will depend on a given application and will be apparent in light of this disclosure.

Whether or not a reference plate 220 is utilized, alignment pins 212 and 214 of interface 210 may be inserted into alignment slot 222 and alignment hole 224, respectively. Once mated with alignment slot 222 and alignment hole 224, interface 210 may be manually and/or mechanically held in place, for instance, during the collection of data by IMU 110. Also, in accordance with an embodiment, it may be desirable to ensure that common reference surface 310 and/or UUA reference surface 410 (whether provided by a reference plate 220 or otherwise associated with platform 300/UUA 400) is substantially flat. As will be appreciated in light of this disclosure, a suitably flat surface may minimize or otherwise reduce the likelihood of introducing errors resulting from wobble/tilting of IMU 110 when operatively coupled with such surface.

Returning to FIG. 1, IMU 110 may be operatively coupled with a power supply 120. In some embodiments, power supply 120 may be a discrete unit/device operatively coupled with IMU 110 and configured to provide power thereto, while in some other embodiments power supply 120 may be integral to IMU 110. In some specific example cases, power supply 120 may comprise one or more electrochemical cells, photovoltaic/photoelectric cells, etc., configured to provide power to IMU 110. Other suitable configurations for power supply 120 will depend on a given application and will be apparent in light of this disclosure.

As previously noted, IMU 110 may be operatively coupled with one or more processors 130. In accordance with an embodiment of the present invention, processor(s) 130 may be chosen, at least in part, based on: (1) the ability to interpret/analyze (e.g., integrate) the angular rate data provided by IMU 110; and/or (2) compatibility with software (e.g., commercially available and/or custom) suitable for implementation with alignment harmonization system 100. Furthermore, it may be desirable to provide processor(s) 130, for example, without incurring great expense, thus reducing/minimizing the overall cost of alignment harmonization system 100, in accordance with an embodiment. Other suitable configurations for processor(s) 130 will depend on a given application and will be apparent in light of this disclosure.

In accordance with an embodiment, the one or more processors 130 may be implemented, for example: (1) in a hand-held or other portable computing device (e.g., PDA-like device, laptop, etc.); (2) as part of an on-board computer of the host platform 300; and/or (3) as an integral component of IMU 110. Furthermore, and in accordance with an embodiment, operative coupling between IMU 110 and the one or more processors 130 may be achieved using any number of suitable data interfacing techniques, such as, but not limited to: (1) a wired connection (e.g., data cable, fiber optic, etc.); (2) a plug-and-play connection (e.g., USB, FireWire, etc.); and/or (3) a wireless connection (e.g., RF transmission, Bluetooth®, etc.). Other suitable data interfacing techniques will depend on a given application and will be apparent in light of this disclosure.

Methodology

Figure 5:
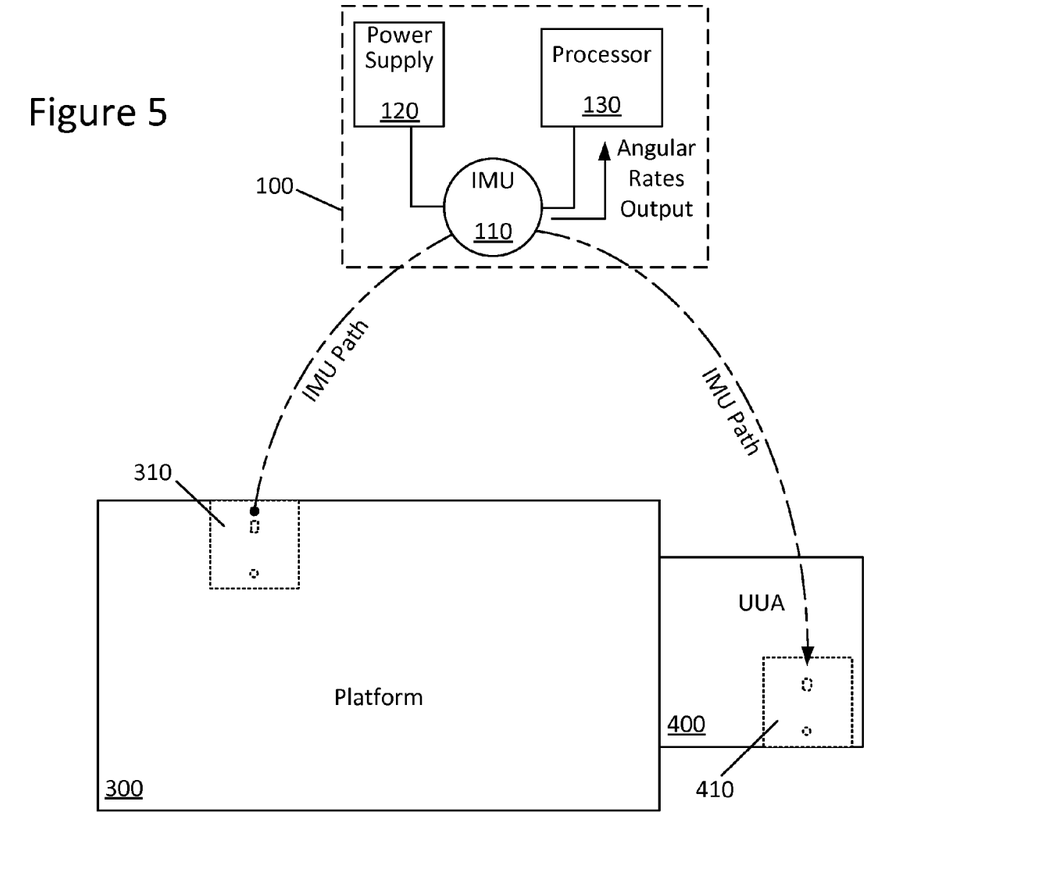
FIG. 5 is a schematic view of an example implementation of an alignment harmonization system in accordance with an embodiment of the present invention.

FIG. 5 is a schematic view of an example implementation of an alignment harmonization system 100 in accordance with an embodiment of the present invention. As can be seen, IMU 110 can be passed or otherwise transitioned from a common reference surface 310 of a platform 300 to a reference surface 410 of a given UUA 400 that is operatively coupled with platform 300. As IMU 110 is so transitioned, it outputs angular rate data to one or more operatively coupled processors 130, which interpret/analyze (e.g., integrate) the data to account for one or more angular rate errors that may be associated with IMU 110. In accordance with an embodiment, this process may be repeated for any number of UUAs 400 (each with its own corresponding reference surface 410) operatively coupled with platform 300, and the claimed invention is not intended to be limited to implementation with only a single UUA 400. After correcting for any angular rate errors, an accurate alignment harmonization of the one or more UUAs 400 may be obtained.

As will be appreciated in light of this disclosure, platform 300 can be any system or vehicle (air, land, sea, etc.) having one or more UUAs 400 implementing, for example, electro-optical and/or gimbaled componentry (e.g., sensors, armaments, targeting systems, weapons systems, countermeasure systems, navigational systems, surveillance systems, etc.) that is to operate within a common coordinate frame.

In accordance with an embodiment, UUA reference surface 410 can be pre-calibrated, for example, with the bore-sight of UUA 400. That is, before receipt from the manufacturer or otherwise before field use/deployment, the alignment of the reference surface 410 of a given UUA 400 (e.g., sensor, gimbaled componentry, etc.) with respect to the boresight (e.g., optical, laser, gun, etc.) of that UUA 400 can be calculated or otherwise determined. Similarly, common reference surface 310 can be pre-calibrated with respect to platform 300. In accordance with an embodiment, pre-calibration of a given reference surface may help to reduce the process time required to achieve alignment harmonization by minimizing or otherwise reducing the need for in-the-field calibration. Other pre-calibration considerations will depend on a given application and will be apparent in light of this disclosure.

In accordance with an embodiment, the process time for alignment harmonization via one or more of the disclosed techniques/architecture may be substantially less than that required by existing approaches (e.g., less than or equal to about 5%, less than or equal to about 10%, less than or equal to about 15%, etc., of the process time of existing approaches). For instance, in one specific example embodiment, alignment harmonization may be achieved with a process time of less than or equal to about 1 hr. However, as will be appreciated in light of this disclosure, a longer process time may result, for example, depending on the total number of UUAs 400 and/or whether pre-calibration (as previously described) was performed before beginning alignment harmonization.

Figure 6:
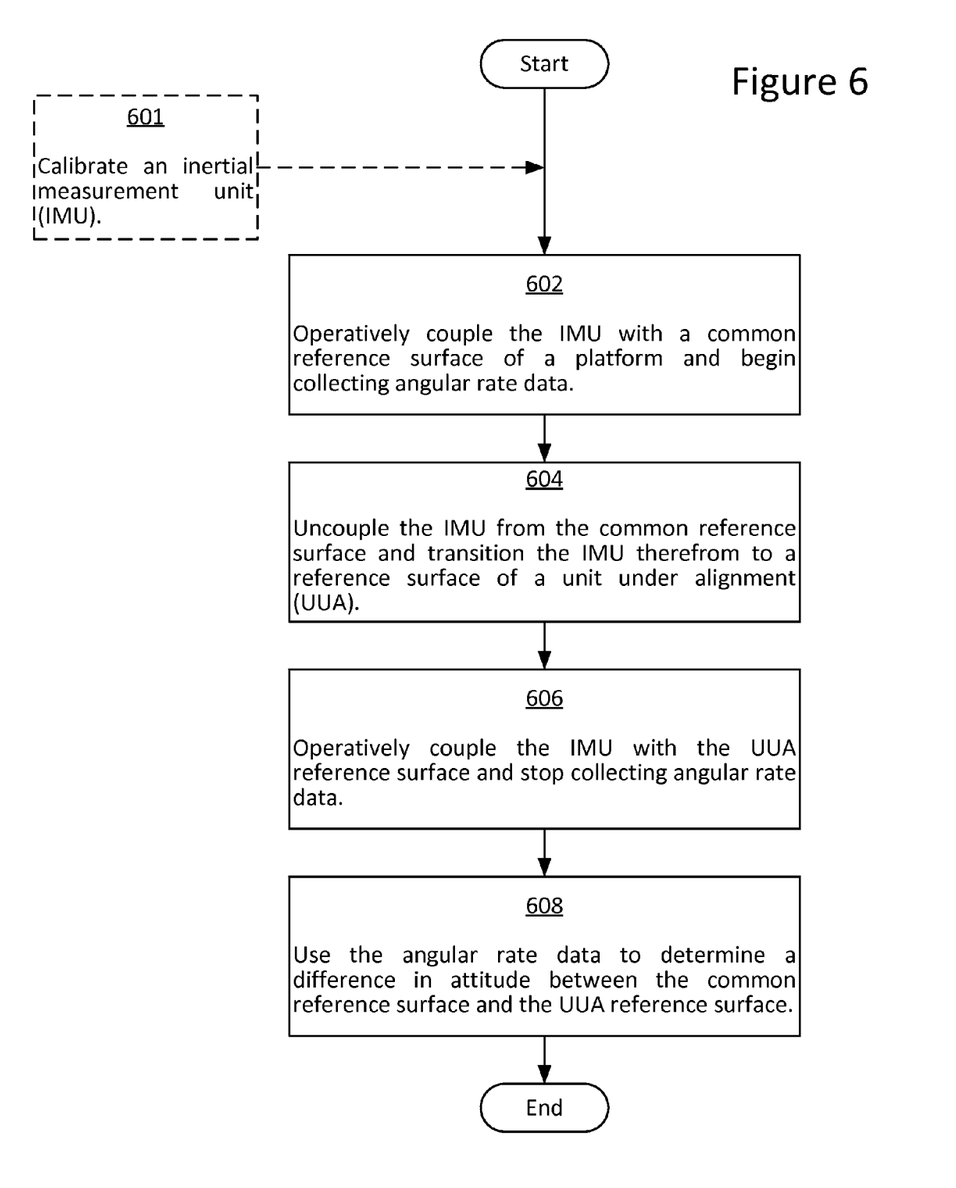
FIG. 6 is a flow diagram illustrating an example method of performing alignment harmonization in accordance with an embodiment of the present invention.

FIG. 6 is a flow diagram illustrating an example method of performing alignment harmonization in accordance with an embodiment of the present invention. The method of FIG. 6 can be implemented, for example, to harmonize the alignment of one or more UUAs 400 that are operatively coupled with a platform 300. Numerous suitable implementations for the disclosed method will be apparent in light of this disclosure.

Turning now to the method of FIG. 6, the method begins, as in block 602, with operatively coupling an inertial measurement unit (IMU) 110 with a common reference surface 310 of a platform 300 and beginning collection of angular rate data. In accordance with an embodiment, operative coupling of IMU 110 to common reference surface 310 may be achieved by manually and/or mechanically holding IMU 110 in place on common reference surface 310. In one specific example embodiment, IMU 110 may be optionally joined with an interface 210, which may be mated with an alignment slot 222 and an alignment hole 224 formed in platform 300 or otherwise in a reference plate 220 that is operatively coupled with platform 300. As will be appreciated in light of this disclosure, and in accordance with an embodiment, it may be desirable to ensure that IMU 110 is substantially flush/flat with common reference surface 310 before beginning collection of angular rate data. Furthermore, and in accordance with an embodiment, beginning or otherwise initializing angular rate data collection may be achieved using any of a wide variety of suitable techniques (e.g., hardware, software, user interface, etc.), as will be apparent in light of this disclosure. In some cases, it may be desirable to determine the attitude of common reference surface 310 (e.g., before beginning angular rate data collection) for subsequent use, for instance, in determining the difference in attitude discussed below with reference to block 608, in accordance with an embodiment.

As will be appreciated in light of this disclosure, in some instances IMU 110 initially may go through an optional calibration (as discussed below with reference to optional block 601), at the end of which IMU 110 remains operatively coupled with the common reference surface 310. Thus, in some such instances, the operative coupling described in block 602 may be provided already, and thus IMU 110 need not be moved or otherwise adjusted at the end of the optional calibration of block 601 before proceeding with block 604.

Next, the method continues, as in block 604, with uncoupling IMU 110 from common reference surface 310 and then transitioning IMU 110 to a reference surface 410 of a unit under alignment (UUA) 400. As previously noted, as IMU 110 is transitioned from common reference surface 310 to UUA reference surface 410, it outputs angular rate data which may be utilized (e.g., such as described below with reference to block 608) to correct for one or more angular rate errors that may be associated with IMU 110. As will be appreciated in light of this disclosure, and in accordance with an embodiment, it may be desirable to ensure that a relatively steady/smooth transition is made, for instance, to minimize or otherwise reduce the likelihood of introducing errors resulting from jarring or otherwise disrupting IMU 110.

Subsequently, the method continues, as in block 606, with operatively coupling IMU 110 to UUA reference surface 410 and stopping collection of angular rate data. Operative coupling of IMU 110 with UUA reference surface 410 may be achieved in much the same way as discussed above with common reference surface 310 in the context of block 602. As will be appreciated in light of this disclosure, and in accordance with an embodiment, it may be desirable to ensure that IMU 110 is substantially flush/flat with UUA reference surface 410 before stopping collection of angular rate data. Furthermore, and in accordance with an embodiment, stopping or otherwise terminating angular rate data collection may be achieved using any of a wide variety of suitable techniques (e.g., hardware, software, user interface, etc.), as will be apparent in light of this disclosure.

Thereafter, the method may continue, as in block 608, with using the angular rate data output by the IMU 110 to determine a difference in attitude between the common reference surface 310 and the UUA reference surface 410. In accordance with an embodiment, the angular rate data may be interpreted or otherwise analyzed (e.g., integrated) by one or more processors 130 operatively coupled with IMU 110. Such interpretation/analysis may be performed, in part or in whole: (1) in real-time; and/or (2) at some later time after collection. As will be appreciated in light of this disclosure, and in accordance with an embodiment, the angular attitude difference can be utilized in alignment harmonization of common reference surface 310 of platform 300 and reference surface 410 of UUA 400.

As previously discussed, a given IMU 110 (e.g., a low-cost IMU) may have a number of errors (e.g., angular rate error, rate scale factor error, etc.) associated therewith which may hinder or otherwise detract from the overall accuracy of alignment harmonization. Thus, in accordance with an embodiment, the method of FIG. 6 optionally may begin, as in block 601, with calibrating the IMU 110 to be used in the alignment harmonization process.

To perform such optional IMU calibration, it may be desirable first to determine: (1) the coordinates (e.g., latitude) of the common reference surface 310 to which IMU 110 will be operatively coupled; (2) the attitude of such common reference surface 310; (3) the heading of such common reference surface 310 with respect to true north; and (4) the direction of gravity (e.g., determination of the downward direction). After such information is gathered, the IMU 110 may be operatively coupled with the common reference surface 310 for a period of time (e.g., in the range of about 5 minutes) sufficient to capture angular rate error data. Thereafter, the IMU 110 may be uncoupled from common reference surface 310, rotated through a given angle (e.g., less than or equal to about 360°, less than or equal to about 720°, etc.), and then recoupled with common reference surface 310 to capture rate scale factor error data. In accordance with an embodiment, the obtained angular rate error and rate scale factor error data can be used (e.g., interpreted/analyzed, such as described above with reference to block 608) to correct for one or more errors (e.g., Earth rate, g-sensitive drift rate, g-insensitive drift rate, rate scale factor error, etc.) that may be associated with IMU 110, thereby contributing to improving the accuracy of alignment harmonization.

As will be appreciated in light of this disclosure, and in accordance with an embodiment, the angular rate error and rate scale factor error data can be used to calibrate IMU 110 and thus establish an IMU reference which may be used as a baseline for all subsequent UUA reference surface 410 attitude measurements. However, as will be appreciated, some IMUs 110 may have minimal or otherwise negligible/manageable errors, and thus the calibration of IMU 110 discussed above with reference to block 601, as previously noted, may be entirely optional, in accordance with an embodiment.

As previously noted, IMU 110 outputs angular rates as it is transitioned from the common reference surface 310 to the corresponding UUA reference surface 410. The resultant data (e.g., angular rates of yaw, pitch, and/or roll rotation) may be transmitted from IMU 110 to one or more processors 130 that are operatively coupled with IMU 110. Processor(s) 130 in turn may be used to interpret or otherwise analyze (e.g., integrate) the angular rate data, and in some cases the aforementioned angular rate error and rate scale factor error data obtained during optional calibration (block 601), to provide an accurate measurement of the angular attitude difference between common reference surface 310 of platform 300 and reference surface 410 of UUA 400 within a common reference frame. Such interpretation/analysis by processor(s) 130 may be performed, for example: (1) using an on-board computer of platform 300, the IMU 110 itself (e.g., in some cases in which a processor 130 is integral to IMU 110), and/or other suitable devices (e.g., laptop, PDA-like device, etc.); and/or (2) with any suitable software (e.g., standard, custom, etc.) which performs the desired interpretations/analysis (e.g., integration).

As will be appreciated in light of this disclosure, the longer the period of time between beginning (block 602) and stopping (block 606) the collection of angular rate data, the greater the magnitude of any accumulated angular rate error(s) associated with IMU 110. However, in accordance with an embodiment, such accumulation of error(s) can be substantially calibrated out using the techniques/architecture described herein to improve the accuracy of alignment harmonization of any given collection of UUAs 400.

Also, as previously noted, the techniques disclosed herein may be readily used, in some instances, to achieve alignment harmonization of multiple UUAs 400. For example, in some embodiments IMU 110 may be passed from a common reference surface 310 to a reference surface 410 of a first UUA 400 (as described above), then back to the common reference surface 310, then to a reference surface 410 of a second UUA 400, and so on for any number of UUAs 400. The steps denoted with respect to blocks 602, 604, and 606 may be repeated to achieve alignment harmonization for each subsequent UUA 400 (e.g., a second UUA, a third UUA, a fourth UUA, etc.) that is operatively coupled with a given platform 300. However, the claimed invention is not so limited; for instance, in some other embodiments in which IMU 110 has sufficiently small errors, IMU 110 may be passed from a common reference surface 310 to a reference surface 410 of a first UUA 400 (as described above), then to a reference surface 410 of a second UUA 400, and so on for any number of UUAs 400, without returning to common reference surface 310.

As will be appreciated in light of this disclosure, once a given UUA reference surface 410 is aligned with UUA 400, further adjustments to such alignment may be unnecessary. However, in accordance with an embodiment, periodic checks/realignments using the disclosed techniques/architecture may be performed to maintain the accuracy of alignment harmonization.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An alignment harmonization system comprising:
   an inertial measurement unit (IMU) configured to output angular rate data relating to an attitude of a common reference surface of a platform and an attitude of a reference surface of a unit under alignment (UUA), wherein the common reference surface and the UUA reference surface operate within a common coordinate frame; and
   a processor operatively coupled with the IMU and configured to interpret the angular rate data to determine a difference in attitude between the common reference surface and the UUA reference surface.

2. The system of claim 1 further comprising the common reference surface and the UUA reference surface.

3. The system of claim 2, wherein the common reference surface comprises a portion of the platform configured to operatively couple with the IMU.

4. The system of claim 2, wherein the common reference surface comprises a reference plate operatively coupled with the platform and configured to operatively couple with the IMU.

5. The system of claim 2, wherein the UUA reference surface comprises a portion of the UUA configured to operatively couple with the IMU.

6. The system of claim 2, wherein the UUA reference surface comprises a reference plate operatively coupled with the UUA and configured to operatively couple with the IMU.

7. The system of claim 2, wherein the IMU is joined with an interface configured to operatively couple with the common reference surface and with the UUA reference surface.

8. The system of claim 7, wherein the common reference surface is configured with an alignment slot and an alignment hole configured to be operatively coupled with the interface, and wherein the UUA reference surface is configured with an alignment slot and an alignment hole configured to be operatively coupled with the same interface.

9. The system of claim 1, wherein the processor is implemented in a laptop, a handheld electronic device, an on-board computer of the platform, and/or the IMU.

10. The system of claim 1, wherein the IMU is calibrated to correct for at least one error associated with the IMU.

11. An alignment harmonization device comprising:
    an inertial measurement unit (IMU) configured to output angular rate data relating to an attitude of a common reference surface of a platform and an attitude of a reference surface of a unit under alignment (UUA), wherein the common reference surface and the UUA reference surface operate within a common coordinate frame;
    a processor operatively coupled with the IMU and configured to interpret the angular rate data to determine a difference in attitude between the common reference surface and the UUA reference surface; and
    a power source operatively coupled with the IMU and configured to provide power to the IMU;
    wherein the device is configured to be operatively coupled with the common reference surface and with the UUA reference surface so as to provide for alignment harmonization of componentry that is to operate within the common coordinate frame.

* * * * *